Patented Aug. 11, 1953

2,648,641

UNITED STATES PATENT OFFICE 2,648,641

FIRE RETARDANT COATING CONTAINING A CARBOHYDRATE, UREA OR MELAMINE-FORMALDEHYDE AND DICYANDIAMIDE OR MELAMINE

John E. Robison, Warren, Oreg., assignor to Fir-Tex Insulating Board Co., St. Helens, Oreg., a corporation of Oregon No Drawing. Application August 3, 1950,
Serial No. 177,550

9 Claims. (Cl. 260—17.3)

This invention relates in general to fire retardant coatings for various materials, including, in particular, composition wall boards, such as fiber insulating board and the like, or other surfacing materials, and also including fabrics.

More specifically, this invention relates to fire retardant coatings which are intumescent and which thus have additional fire retarding properties resulting from such intumescence.

While the use of fire retarding coatings which are intumescent to some extent is not entirely new, the two principal defects heretofore in such coatings have been that the resulting coatings were neither weather proof nor washable.

The usual formulation for such fire retardant coatings consists of a carbohydrate (such as starch, sugar, or dextrine) in combination with a soluble salt of known fire retardant properties (usually salts of phosphoric or boric acid). The carbohydrate acts as an inhibitor for the crystallization of the salt and holds it firmly in the treated material. A fire retardant of this type is normally applied to cloth although it might also possibly be impregnated in the surface of wood. However, fire retardants of this formulation have to be renewed whenever the treated material or surface comes into contact with water and thus the material or surface is not washable, and similarly would not be weather proof.

While it is known that the reinforcing of the starch by the use of a synthetic resin (either a urea-formaldehyde or melamine-formaldehyde resin) will give such resulting fire retardant coating or impregnation a greater degree of permanence, nevertheless this does not render the same washable or weather proof. It is also known that the synthetic resin can be polymerized in the presence of the fire retardant salt to produce a fire retardant coating which will be intumescent, but such a coating will have but very little permanence if exposed to the weather. Furthermore, very little pigmentation in a coating of this type is sufficient to cause a serious loss of intumescence.

An object of the present invention is to produce an improved intumescent fire retardant coating which will be washable.

A related object is to produce such a coating which will be weather proof.

Another object of the invention is to produce an improved intumescent fire retardant coating which can be pigmented without loss of intumescence.

In carrying out my invention I provide a novel and improved fire retardant coating which is intumescent and which achieves the above mentioned objects in that such coating, when properly cured, is weather proof and washable, and may be pigmented easily without interfering with the intumescent properties. The chief distinction between my intumescent fire retardant coating and previous fire retardant coatings lies in the fact that the highly soluble fire retardant salt heretofore considered necessary is not included in my formulation.

The active ingredients of my improved fire retardant coating comprise a reacted aminoplast-aldehyde resin, an amido compound and a carbohydrate. To these active ingredients may be added pigments, preservatives, thickening agents, plasticizers, etc., as desired to meet the conditions of application. Either an organic solvent system or an aqueous solvent system may be used to carry the ingredients. The applied coating may be cured with heat or with a catalyst, depending on the circumstances of application.

The intumescence in my coating depends upon the proper combination of the aminoplast-aldehyde resin, amido compound and carbohydrate. If such combination hereinafter specified is not adhered to fairly closely, the intumescent properties of the coating will be considerably lessened. While the coating film will still act as a good fire retardant it will not provide the additional desirable protection afforded by the foam caused by flame impingement on the coating, which would be true with a coating having the desired intumescent properties.

In my improved coating the aminoplast-aldehyde resin may be either catalyzed or may be thermosetting, according to the application conditions. Aminoplasts, as is well known, are synthetic resins derived from amino (including imino) or amido (including imido) compounds, a typical example being urea-formaldehyde resins (reference: Modern Plastics, vol. 17, No. 2, October 1939, p. 433).

The amido compound may be any derivative of cyanamide, such as are used normally in the production of an aminoplast. Examples are melamine and dicyandiamide.

The carbohydrate can be any carbohydrate, such as sugars, starches, gums and cellulose.

The function and action of the three active ingredients in my improved fire retardant coating may be described as follows:

(1) The aminoplast-aldehyde resin, while acting as the waterproofing binder for the coating, during burning acts as a stabilizer for the foam, as well as creating combustion products which increase the amount of foam;

(2) The carbohydrate, while it may be inflammable in itself, in this case has only charring and gas producing properties due to the presence of the aminoplast-aldehyde resin and the amido compound;

(3) The amido compound forms an inert gas under the influence of heat, and also furnishes carbon to aid the foam stability.

In carrying out my invention the three active ingredients of my improved coating as above mentioned, may be used in various proportions within the following ranges:

| | Parts |
|---|---|
| Aminoplast-aldehyde resin | 10 to 50 |
| Amido compound | 40 to 80 |
| Carbohydrate | 10 to 50 |

These ingredients may be applied as a coating in concentrated form, or they may be diluted with water or solvent and applied by dipping, spraying, or other methods of coating or impregnating.

Preferably, when employing either a solvent system or an aqueous system, I use the three active ingredients in the following approximate proportions:

| | Parts |
|---|---|
| Aminoplast-aldehyde resin | 20 |
| Amido compound | 40 |
| Carbohydrate | 20 | and I regard this as the basic formulation.

The following are given as some of the examples in which my invention can be carried out under this basic formulation and provide various coatings. These examples are illustrative only and my invention is not to be considered as limited to them.

*Example 1*

| | Parts |
|---|---|
| Water | 60 |
| Melamine resin | 20 |
| Dicyandiamide | 40 |
| Starch | 20 |

The fire retardant coating made as above specified was applied as a coating to a structural fiber insulating board and was then tested for fire retardant properties in accordance with the procedure given in Commercial Standard CS-42-49. When the material was applied with a coverage of 15 grams of solids per square foot, the char area on the fiberboard underneath the foam was less than six square inches. Black foam was created by the flame, which rose more than one inch above the surface being tested, and formed an insulating layer which prevented the intense heat from the alcohol flame from reaching the inflammable wood fibers. Washability of this coating was tested in accordance with the procedure given in Federal Specification TT-P-88a. The coating withstood over 175 strokes of the brush before any failure of the film occurred.

*Example 2*

| | Parts |
|---|---|
| Water | 60 |
| Urea resin | 20 |
| Dicyandiamide | 40 |
| Starch | 20 |

*Example 3*

| | Parts |
|---|---|
| Xylol | 70 |
| Melamine resin | 20 |
| Dicyandiamide | 40 |
| Starch | 20 |

*Example 4*

| | Parts |
|---|---|
| Water | 70 |
| Melamine resin | 20 |
| Melamine | 40 |
| Nut shell flour | 20 |

*Example 5*

| | Parts |
|---|---|
| Xylol | 70 |
| Urea resin | 20 |
| Dicyandiamide | 40 |
| Sugar (sucrose) | 20 |

If it is desired to use the fire retardant coating on a fabric, it is preferable to cook the carbohydrate, amido compound and aminoplast-aldehyde resin together so as to form a dilute solution which can be applied to the fabric by an immersion process at an elevated temperature. Such a coating may be prepared as follows:

*Example 6*

| | Parts |
|---|---|
| Water | 120 |
| Melamine resin | 20 |
| Dicyandiamide | 40 |
| Starch | 20 |

All the ingredients should be mixed into half the water until well dispersed. Then the remaining water should be added and the mixture heated to 175° F. It should be held at this temperature for 15 minutes, then cooled to the desired temperature for immersion. If the mixture is too thin, thickening agents such as alginic acid derivatives may be added. Water dispersible or water soluble dyes may be added to this mixture to give any desired color to the cloth.

A pigmented fire retardant coating under my invention can be made as follows:

*Example 7*

| | Parts |
|---|---|
| Water | 60 |
| Titanium dioxide | 10 |
| Melamine resin | 20 |
| Melamine | 40 |
| Sugar | 20 |
| Sodium pentachlorophenate | 0.3 |

This pigmented coating, when applied to structural fiber insulating board with a coverage of 23 grams per square foot (15 grams of fundamental ingredients per square foot), gave exactly the same fire protection as did the unpigmented coating given in Example 1.

All of the above coatings are alkaline in character and are designed for heat curing of the resin. If it is desired to produce an air drying coating, an accelerator must be added to reduce the pH of the coating mix to between 4.5 and 5.5. The type of accelerator to be used should be determined by the properties of the resin used, the viscosity desired in the coating mix, and the time it must remain stable. The following is an example of an air drying coating made in accordance with my invention which I have found to be satisfactory:

Example 8

| | Parts |
|---|---|
| Water | 60 |
| Melamine resin | 20 |
| Dicyandiamide | 40 |
| Starch | 20 |
| Titanium dioxide | 10 |
| Sodium pentachlorophenate | 0.3 |
| Aluminum chloride | 0.5 |

This mixture has a pH of 5.0, and will air dry in a period of three weeks and form a coating which will have the properties of the coating described as Example 1.

If it is found that the coatings in any of the above examples are too hard and brittle for the purpose intended, they may be plasticized by the use of any agent which will render the cured resin more flexible, such as chlorinated waxes, chlorinated paraffins, aryl sulfonamide resin-triphenyl phosphate, or N,N-di-beta-hydroxyethyl ortho-para-toluenesulfonamide (Santicizer 132).

My fire retardant coating, when made as specified, or when prepared in accordance with any of the examples given, and when properly cured, will be washable, weatherproof, and intumescent. The coating can be applied to cloth, wood, metal, wallboard, concrete, or other surfaces on which protection from fire or from the heat of flames is desired. Upon contact with fire or flames, the coating will puff or foam to form a protective insulating layer of carbon. The thickness of this layer of course depend on the amount of coating applied.

I claim:

1. A fire retardant, intumescent coating composition of the character described comprising urea formaldehyde resin, melamine, and a carbohydrate as the active ingredients, said active ingredients being approximately in the relative ratio of 1:2:1 respectively, said active ingredients carried in an aqueous solvent system.

2. A fire retardant, intumescent coating composition of the character described comprising melamine formaldehyde resin, dicyandiamide, and cellulose as the active ingredients, said active ingredients being approximately in the relative ratio of 1:2:1 respectively, said active ingredients carried in a solvent with the addition of a pigment.

3. A fire retardant, washable, intumescent coating composition of the character described including a reacted aminoplast-aldehyde resin selected from the group consisting of urea-formaldehyde resin and melamine formaldehyde resin, an amido compound selected from the group consisting of melamine and dicyandiamide, and a carbohydrate as the active ingredients, the said active ingredients being approximately in the relative ratio of 1:2:1 respectively, and said active ingredients carried in a solvent.

4. A fire retardant, washable, intumescent coating composition including a reacted aminoplast-aldehyde resin consisting of melamine formaldehyde resin, dicyandiamide, and starch as the active ingredients, the said active ingredients being approximately in the relative ratio of 1:2:1 respectively, said active ingredients carried in an aqueous system.

5. A fire retardant, weather-proof, pigmented, intumescent coating composition of the character described including, a reacted aminoplast-aldehyde resin consisting of urea-formaldehyde resin, dicyandiamide, and a carbohydrate as the active ingredients, the said active ingredients being approximately in the relative ratio of 1:2:1 respectively, said active ingredients carried in a solvent together with an added pigment.

6. A fire retardant, intumescent coating composition of the character described including a reacted aminoplast-aldehyde resin consisting of melamine formaldehyde resin, an amido compound consisting of melamine, and starch as the active ingredients, the said active ingredients being approximately in the relative ratio of 1:2:1 respectively, and said active ingredients carried in an organic solvent system.

7. A fire retardant, intumescent coating composition of the character described including melamine-formaldehyde resin, dicyandiamide, and a carbohydrate as the active ingredients, the relative portions of said ingredients being from 10 to 50 parts of melamine-formaldehyde resin to 40 to 80 parts of dicyandiamide to 10 to 50 parts of the carbohydrate, and said ingredients carried in a solvent.

8. A fire retardant, intumescent coating composition of the character described including melamine-formaldehyde resin, dicyandiamide, and sugar as the active ingredients, the relative portions of said ingredients being from 10 to 50 parts of melamine-formaldehyde resin to 40 to 80 parts of dicyandiamide to 10 to 50 parts of sugar, and said ingredients carried in a solvent.

9. A fire retardant, intumescent coating composition of the character described including melamine-formaldehyde resin, dicyandiamide, and starch as the active ingredients, the relative portions of said ingredients being from 10 to 50 parts of melamine-formaldehyde resin to 40 to 80 parts of dicyandiamide to 10 to 50 parts of starch, and said ingredients carried in a solvent.

JOHN E. ROBISON.

References Cited in the file of this patent

UNITED STATES PATENTS

| Number | Name | Date |
|---|---|---|
| 2,056,454 | Howald | Oct. 6, 1936 |
| 2,193,621 | Cordier | Mar. 12, 1940 |
| 2,328,424 | D'Alelio | Aug. 31, 1943 |
| 2,368,451 | D'Alelio | Jan. 30, 1945 |
| 2,452,054 | Jones | Oct. 26, 1948 |